Sept. 25, 1951  C. K. GRAVLEY  2,569,163
METHOD OF MAKING A CERAMIC BODY
Filed Dec. 28, 1948
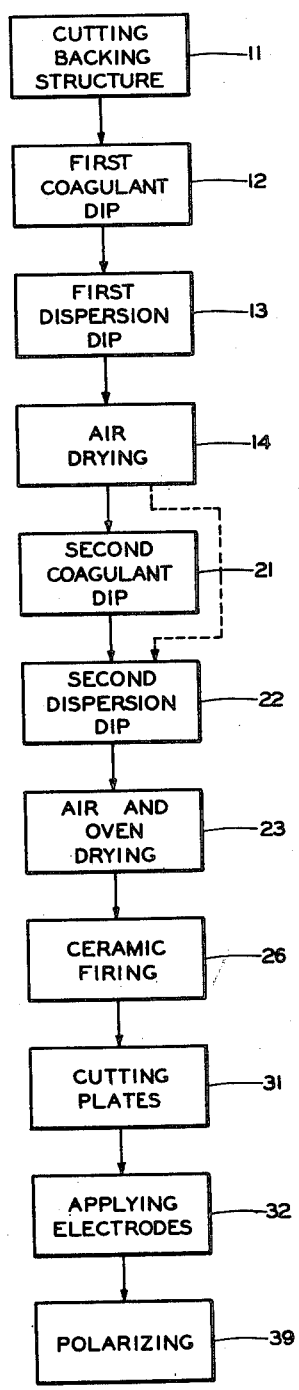
FIG. 1
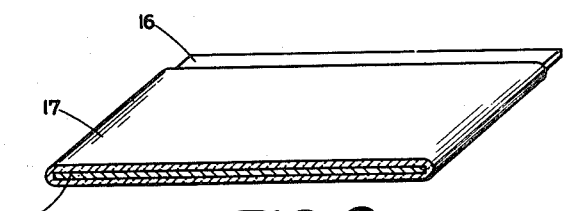
FIG. 2
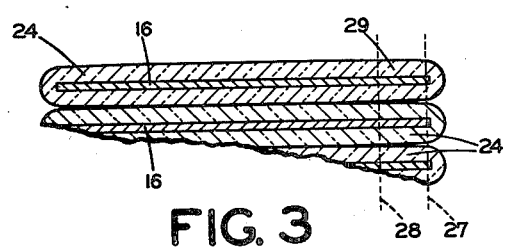
FIG. 3
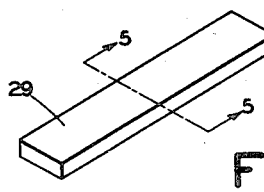
FIG. 4
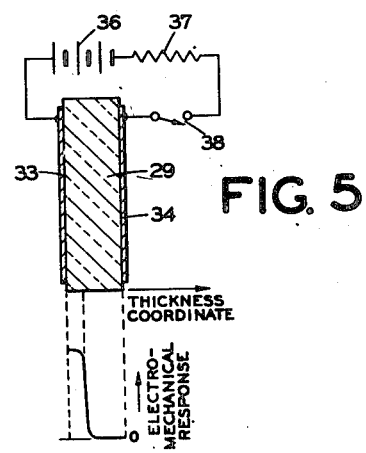
FIG. 5
FIG. 6
INVENTOR.
CHARLES K. GRAVLEY
BY
Harris A. Mumma Jr.
ATTORNEY Patented Sept. 25, 1951

2,569,163

UNITED STATES PATENT OFFICE 2,569,163

METHOD OF MAKING A CERAMIC BODY

Charles K. Gravley, Lakewood, Ohio, assignor to The Brush Development Company, Cleveland, Ohio, a corporation of Ohio Application December 28, 1948, Serial No. 67,695

10 Claims. (Cl. 25—156)

This invention relates to methods of making a ceramic body, and more particularly to methods of making a ceramic body containing electromechanically responsive material. A ceramic material is "electromechanically responsive," as this term is used in this specification and in the appended claims, when the material is capable, or may be made capable by suitable electrical conditioning, of developing substantial electrical charges when subjected to mechanical stresses.

This application is a continuation-in-part of my application Ser. No. 32,588 now Patent No. 2,554,327 for Letters Patent of the United States entitled, "Method of Making Shapes of Electromechanically Sensitive Material," filed June 12, 1948, and assigned to the same assignee as the present invention. In accordance with the process disclosed and claimed in this copending application, a coating or layer of raw ceramic material is produced on a suitable backing or form of unrefractory material, after which the layer is heated to ceramic-firing temperatures. The ceramic raw material is available in the form of a dispersion and is caused to deposit on the form or backing by the action of a coagulating agent applied to the backing. A titanic raw material such as barium titanate may be used in the formation of the ceramic body.

The electromechanical response properties of various polycrystalline titanate ceramic materials have been investigated. It has been established that an electroded body of certain of these polycrystalline materials, for example a material comprising primarily barium titanate, may be subjected to the field produced by a rather strong unidirectional electric potential so as to make it capable of developing very considerable electric charges when subjected to compressive or expansive mechanical stresses. This electromechanical response probably depends both on the electrostatic polarization of the material by the unidirectional potential applied thereto and on the properties of the material before such treatment. A barium titanate body retains most of the polarization acquired by this electrical conditioning for indefinite periods of time, provided its temperature is not raised above a critical value in the neighborhood of 120° C. Other titanate ceramic materials, such as compounds or solid solutions of barium titanate and strontium titanate, do not retain such permanent polarization, since the critical value of temperature for such materials is lower than the temperatures usually encountered in practice. For example, a ceramic body containing barium titanate and strontium titanate in a ratio substantially lower than the ratio of 7 mols of the former to 3 mols of the latter, subjected for a period of time to a unidirectional electric potential, does not thereafter retain the property of the substantial electrical response to mechanical stresses at the usual room temperatures and at higher temperatures. Accordingly, the barium titanate material and the barium-strontium titanate material upon such electrical conditioning have different electromechanical response properties.

In a copending application Ser. No. 67,645 filed in the name of Hans G. Baerwald, concurrently with the present application, and assigned to the same assignee as the present invention, there is disclosed and claimed a transducer device comprising a body substantially free of structural discontinuities. One portion of the body is of a dielectric material which is conditioned by the application of a unidirectional electric potential to provide a substantial transducing-response characteristic, while another portion has a different transducing-response characteristic. During transducing between mechanical signal energy and electrostatic-field signal energy in this body a flexural motion such as a bending takes place. This flexure is associated with mechanical reaction between the portions of the body having different transducing-response characteristics. The body may be made up of polycrystalline titanate material which has been polarized by an electrostatic field, followed by depolarization of a portion of the thickness of the body through the action of localized heating of that portion to temperatures in the neighborhood of 120° C. In an application filed concurrently herewith in the name of Harry C. Page, Ser. No. 67,741, there is disclosed and claimed a flexure-sensitive transducer device comprising a body substantially free of structural discontinuities which has portions of materials of different composition. One of these portions is of a dielectric material which is conditioned by the application of a unidirectional electric potential to provide a substantial transducing-response characteristic. Another portion of the same body, being of material of a different composition, has a different transducing-response characteristic upon the application of the same unidirectional potential. As an example, a body consisting primarily of raw barium titanate in the shape of a plate may be treated on one face only of the plate during ceramic firing with controlled amounts of an oxidic material such as strontium oxide or stannic oxide to modify the composition of the material underlying the face treated in this manner, so that such material cannot retain remanent polarization at the temperatures of use. After the body has been polarized and the polarizing field removed, transducing between mechanical and electrostatic energy and involving a flexural motion of the body may occur, the flexure again being associated with mechanical reaction between the several portions having different transducing-response characteristics by virtue of the difference of their remanent polarizations.

While efficient flexure-sensitive transducer devices may be made in accordance with the methods suggested in the examples mentioned hereinabove, there are problems of controlling the extent of the thermal or chemical treatment applied to the body of electromechanically sensitive material for producing electromechanical response properties which differ in the treated and untreated portions of the body. These problems may be solved by careful control of the processes, and this usually may be done without raising the cost of the body containing electromechanically responsive ceramic material very greatly. However, it would be advantageous to utilize a method of making such a ceramic body which would yield a body substantially free of structural discontinuities and of the desired quality and distribution of properties through the body without the necessity of exercising rather critical control over a thermal or chemical treatment.

Accordingly, it is an object of the present invention to provide a new and improved method of making a ceramic body which substantially avoids one or more of the limitations and disadvantages of prior methods of the type described.

It is another object of the invention to provide a new and improved method of making a unitary ceramic body containing portions of materials of different composition.

It is a further object of the invention to provide a new and improved method of making a ceramic body containing portions of materials of different composition which does not involve critical controls of the time and extent of treatment of the ceramic body.

It is yet another object of the invention to provide a novel and inexpensive method of making a ceramic body for use in a flexure-sensitive transducer device.

In accordance with the invention, the method of making a ceramic body containing electromechanically responsive material comprises forming a first layer of a ceramic raw material, then forming on the first layer a second layer of a ceramic raw material of a composition different from that of the first-mentioned ceramic material but substantially free of fluxing and chemical action therewith. The material used in one of these first and second layers is susceptible, after firing, to conditioning by the application of a unidirectional electric potential to provide an electromechanical response property, and the material of the other of these layers, upon firing and the application of the unidirectional potential, is effective to provide a different-valued electromechanical response property. The method further includes heating the body thus formed to ceramic-firing temperatures to produce a unitary coherent body of polycrystalline ceramic material having two thickness portions, corresponding to the aforesaid first and second layers, of materials having, upon the conditioning with the unidirectional potential, the aforesaid different-valued electromechanical response properties in the two portions of the body. It will appear hereinbelow that, compared with the electromechanical response property to which one of the layers is susceptible, the different-valued electromechanical response property which may be provided by the material of the other layer in many cases not only is lower-valued but even may be a zero-valued electromechanical response property. In other words, the material of the other layer may exhibit no appreciable electromechanical response.

For a better understanding of the present invention, together with other and further objects thereof, reference is had to the following description taken in connection with the accompanying drawing, and its scope will be pointed out in the appended claims.

In the drawing, Fig. 1 is a block diagram showing successive steps in a complete process embodying the method of making a ceramic body in accordance with the present invention; Fig. 2 is a perspective view of a ceramic body made in accordance with the method represented in Fig. 1 after only a portion of the raw ceramic body has been formed, the front part of the body being cut away so that its thickness is seen in section; Fig. 3 is a sectionalized view of a body such as that shown in Fig. 2 but at a later stage of the process, portions of several such bodies being illustrated in stacked relationship; Fig. 4 is a perspective view of one of a number of fired bodies cut from the larger bodies illustrated in Fig. 3; Fig. 5 is a sectional view, taken in the direction indicated 5, 5 in Fig. 4, of an electroded body and a polarizing arrangement therefor; and Fig. 6 is a representative rough plot of the electromechanical response of the polarized body of Fig. 5 as a function of the thickness of the body, the thickness coordinate of the plot of Fig. 6 being aligned with the thickness direction in the view of Fig. 5.

Referring now to Fig. 1 of the drawing, there is represented in flow sheet form a method of making a ceramic body containing electromechanically responsive material. The ceramic body may be formed on any of numerous types of surfaces. For example, the body may be formed in long strips on an elongated surface from which the body is removed before or after ceramic firing and cut into strips of the approximate length of the individual bodies which it is desired to produce. In a preferred form of the invention, however, a backing material such as highly calendered paper or other fibrous or plastic sheeting is cut into strips on which the ceramic body is formed. The step of cutting such a backing structure from a large sheet of the backing material is represented at 11 in Fig. 1.

There is formed now on this backing of unrefractory material a first layer of a ceramic raw material. The formation of this layer is facilitated by applying to the backing structure an agent, preferably an aqueous ammonium pentaborate solution, for causing coagulation of a ceramic raw material from a dispersion thereof in a liquid medium. This step conveniently may be carried out by dipping the backing structure of unrefractory material into the liquid coagulating agent; this first coagulant dip is represented at 12 in Fig. 1. Contact then is caused between the coagulating agent on the backing structure and a quantity of such a dispersion of a first ceramic raw material to effect coagulation on the backing structure of the first layer comprising the aforesaid first ceramic raw material. An aqueous dispersion of a titanate raw material, in which is dissolved a small quantity of a dispersing agent, may be used. It is desirable to include a dissolved bonding material such as polyvinyl alcohol in the dispersion. Coagulation on the backing structure of the raw ceramic layer then is effected by the action of the ammonium pentaborate solution, and the layer thus formed is bonded by polyvinyl alcohol coagulated from the solution. The bonding effect protects the first layer thus formed during subsequent steps of the process. Contact between the backing and the dispersion conveniently may be caused by dipping the backing structure, carrying the coagulating agent, into the dispersion, and this first dispersion dip is represented at 13 in Fig. 1.

After the first layer had been formed, the backing carrying the layer is removed carefully from contact with the dispersion of the first ceramic material and is subjected to air drying, as represented at 14 in Fig. 1. The drying at this stage of the process need not be thorough, and exposure to the atmosphere of the room for a period of 15 to 30 minutes at ordinary temperatures and humidities usually suffices. The product of the steps 11—14 is represented in the sectional perspective view of Fig. 2. The backing structure 16 is seen in section at the front of the view, and the portion of the backing 16 from which the structure was suspended during the first coagulant and dispersion dips 12 and 13 extends from the back of the body. A thin layer 17 of the first ceramic material is seen on the backing 16. This first layer may be quite thin, for example approximately 0.003 to 0.005 inch in thickness. It extends quite uniformly around the backing structure 16, as a result of the coagulating action described in my aforementioned copending application Ser. No. 32,588, in which there appears a detailed discussion of materials and process steps adapted to the production of a layer of ceramic raw material on a backing in the manner discussed generally hereinabove.

Subsequently, there is formed on this first layer a second layer of a ceramic raw material of a composition different from the composition of the first-mentioned ceramic material but substantially free of fluxing and chemical action therewith. It may be desirable to apply to the previously formed first layer an agent for causing coagulation of a ceramic raw material from a dispersion thereof. This may be done in a second coagulant dip 21 quite similar to the first coagulant dip 12 and of brief duration. Contact subsequently is caused between this last-mentioned coagulating agent on the first layer and a quantity of a dispersion of the second ceramic raw material to effect deposition by coagulation on the first layer of the second layer comprising the second ceramic raw material. It frequently is the case, however, that the second coagulant dip 21 may be omitted and the second layer deposited merely by dipping the backing structure carrying the first layer into a liquid dispersion of the second ceramic raw material. This second dispersion dip is represented at 22 in Fig. 1, and the alternative omission of the second coagulant dip 21 is indicated by a dashed arrow. It is probable that some of the coagulating agent from the first coagulant dip 12 penetrates the first layer 17 to assist in the formation of the second layer. However this may be, it has been observed that a well formed outer layer may be produced in many cases, especially over the broad flat faces of the backing 16, without recourse to a second coagulant dip.

After the second layer has been built up on the first layer to the desired thickness, the backing carrying the two layers is removed slowly from contact with the dispersion of the second ceramic material and allowed to dry in air until any large accumulations of liquid on the outer surfaces have been removed by dripping and evaporation. The coated backing structure then may be placed in an oven and heated moderately for an hour or more to remove much of the moisture from the body of ceramic material. The air and oven drying operations are indicated at 23 in Fig. 1. A lateral cross section of the body now appears as illustrated in Fig. 3, in which the backing structure 16 again is viewed in section. The material of the second layer has covered and practically obliterated the outer surface of the original layer 17, which consequently is not indicated in Fig. 3. The acquisition of the second layer has made the total cross-sectional thickness of raw ceramic material considerably greater than was the thickness of the first layer 17, and the body built up of both layers is indicated at 24 in Fig. 3. As an example, the second layer may add approximately 0.006 to 0.009 inch in thickness to the body.

The choice of the ceramic raw materials used in forming the two layers is such that the material of one of the first and second layers, for example the first layer, is susceptible, after firing, to conditioning by the application of a unidirectional electric potential to provide an electromechanical response property, while the material of the other of the two layers, for example the second layer, upon firing and the application of the unidirectional potential, is effective to provide a different-valued electromechanical response property.

A number of the dried raw ceramic bodies 24, coated on backing structures 16, may be stacked one above the other, as indicated in Fig. 3, for insertion in a ceramic-firing oven. In this oven the body, formed of raw ceramic materials as described hereinabove, is heated to ceramic-firing temperatures with elimination of the unrefractory backing material, which volatilizes, burns, or otherwise disintegrates at the high temperatures of firing. During the firing the incipient sintering or intergranular vertification which is associated with ceramic-firing operations takes place throughout the body, including the regions where the initially deposited particles of the second layer were laid down on the outer particles of the first layer 17. The ceramic materials of the layers are chosen of compositions which have the ability, probably involving the molecular or granular structure and the softening temperatures of providing a ceramic bond, in the regions where the composition of the materials changes from point to point, which is substantially as strong as the ceramic bond existing between particles of material in the middle of either one of the layers. It is desirable that the moisture content and other ceramic conditioning of the materials in the body 24 be adjusted or equalized to give fairly uniform shrinkage of all portions of the body during ceramic firing. Thus, the ceramic-firing operation produces a unitary coherent body of polycrystalline ceramic material having substantially uniform elastic properties and substantially free of structural discontinuities. While local imperfections of a small and scattered nature may appear within the body 24 after firing, for example in the regions of greatest variation of the composition of the material, the essentially unitary and noncomposite nature of the fired body may be obtained easily by carrying out the ceramic-firing operation with the usual regard for firing temperatures suitable for the ceramic material and length of firing time. The ceramic-firing operation is represented at 26 in Fig. 1.

The fired body 24 has two thickness portions, corresponding to the first and second layers formed on the original backing 16, of materials having upon conditioning by the application to the body of a unidirectional electric potential the aforementioned different-valued electromechanical response properties in the two portions. Of course, the composition of the raw materials used in forming the two layers should be such that the materials are free of fluxing and chemical action upon each other in order to preserve the nature of the layers during the operations described hereinabove. Preferably the composition of the two layers is made rather similar. More specifically, at least one of the first and second layers may be of a titanate material, preferably a barium titanate material, while the other layer also may be made up of a titanate ceramic material of a different composition. Thus, one of the layers may contain primarily barium titanate while the other of the layers contains primarily barium-strontium titanate, fractional percentages of silica, soda, lime, and alumina also being present in the material. A typical firing cycle for such a body involves raising the temperature over a period of several hours to ceramic-firing temperatures in the region 1340-1400° C., which temperatures are held for about two hours or for a shorter period at the higher temperatures.

After the firing operation the body 24, of the stack of such bodies illustrated in Fig. 3, may be subjected to a cutting operation to provide plates of electromechanically responsive material suitable for use in electromechanical transducers. Thus a series of cuts may be made through the stack of plates starting near the right-hand edges of the plates; the first cut may be made in a plane indicated 27 in Fig. 3 and successive cuts made in spaced parallel planes such as that indicated at 28. The rounded edge portions of the bodies 24 may be discarded, leaving plates such as the plate 29 shown in Fig. 4. The position of the plate 29 in the original body 24 is indicated at the upper right-hand portion of Fig. 3 between the dashed lines 27 and 28 representing the first two cuts. It will be clear that similar plates may be obtained from the portions of the body 24 formed beneath as well as on top of the backing structure 16, and that two such plates are provided by each body 24 for each of the parallel cuts 28, etc. The thickness of the plate 29 is determined by the duration of the dispersion dips 13 and 22 and by the strength of the coagulating agent used. The width of the plate 29 is determined by the separation of the parallel cuts 27 and 28, while its length is determined by the depth to which the form 16 was dipped in the dispersions. The plate 29 may be trimmed by conventional machining operations to the desired shape. It will appear that such plates may be produced inexpensively from inexpensive ceramic materials by the use of uncomplicated ceramic techniques. The operation of cutting the plates is represented at 31 in Fig. 1.

For use in electromechanical transducers, the step 32 of applying electrodes to the plate 29 now may be carried out. Fig. 5 is a transverse sectional view of the plate 29 of Fig. 4, showing electrodes 33 and 34 covering most of the two major surfaces of the plate 29. These electrodes may be of thin metal foil or of a bonded granular conductive material such as graphite. Connections from the electrodes 33 and 34 may be made to a polarizing source such as the battery 36 through a high resistance 37 and a switch 38, as illustrated in Fig. 5. When the switch 38 is closed, a unidirectional polarizing field, which may approach the electrical breakdown field strength of the body 29, is applied across the body. The switch may be opened after a short period of time and the connections to the electrodes removed, permitting the use of the polarizing apparatus 36—38 subsequently on other plates. The polarizing operation is represented at 39 in Fig. 1.

When the left-hand thickness portion underlying the electrode 33 is of a barium titanate material and the right-hand thickness portion underlying the electrode 34 is of a suitable barium-strontium titanate material, a condition of remanent polarization then obtains in the left-hand portion. However, since the barium-strontium titanate material is above a critical temperature, it retains no appreciable permanent polarization after the switch 38 is opened. The electromechanical response properties of the body 29 resulting from the polarization conditioning are represented in Fig. 6, which is aligned vertically beneath the sectional view of Fig. 5 to correlate the response properties with a thickness coordinate corresponding to the thickness direction in the view of Fig. 5. As shown by Fig. 6, the electromechanical response properties are of high magnitude in the left-hand portion, while the right-hand portion exhibits a substantially lower-valued electromechanical response property, specifically, a substantially zero-valued response property. A very narrow zone of rapidly changing response exists between the two thickness portions.

The electrical conditioning referred to hereinabove may be carried out during operation of the electroded element 33 in a transducer device. Thus a high unidirectional potential may be applied to the element as illustrated in Fig. 5 at the same time that an A. C. signal is developed between the electrodes 33 and 34. The electromechanical signal response of one thickness portion comprising barium titanate is somewhat higher when a polarizing potential is applied continuously than when remanent polarization alone is utilized. If the other thickness portion is a titanate material containing about 5 mols of barium stannate per mol of barium titanate, it has a much lower-valued response than that of the barium titanate portion even under a continuous polarizing field. Accordingly, a body having the two portions just described also is suitable for use in a flexure-sensitive transducer device.

In a preferred method embodying the present invention the ceramic material of the second layer in the body 24 also has a different dielectric constant from that of the ceramic material of the first layer, so that after firing the one of the two portions of the body 24 which is effective to provide a lower-valued response property upon electrical polarization also has a dielectric constant larger than that of the material of the other layer. This condition occurs when the electromechanically unresponsive material is barium-strontium titanate and the responsive material is barium titanate, since the former has a larger dielectric constant at ordinary temperatures of use. As a result, a signal in the form of an electric potential applied across the entire body, as between the electrodes 33 and 34 on the plate 29 of Fig. 5, produces a field strength of greater intensity in the responsive portion of the plate, thus increasing the efficiency of the plate as a transducer element. The relative thickness of the two portions of the body from which the plate is cut may be varied at will by suitable control of the coagulant and dispersion dipping operations. In general, either the material having a low response or the material having a high response may be in the layer of raw ceramic formed first on the backing structure.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of making a ceramic body containing electromechanically responsive material comprising: forming a first layer of a ceramic raw material; forming on said first layer a second layer of a ceramic raw material of a composition different from that of said first-mentioned ceramic material but substantially free of fluxing and chemical action therewith, the material of one of said first and second layers being susceptible, after firing, to conditioning by the application of a unidirectional electric potential to provide an electromechanical response property, and the material of the other of said layers, upon firing and said application of said potential, being effective to provide a different-valued electromechanical response property; and heating the body thus formed to ceramic-firing temperatures to produce a unitary coherent body of polycrystalline ceramic material having two thickness portions, corresponding to said first and second layers, of materials having upon said conditioning said different-valued electromechanical response properties in said two portions.

2. The method of making a ceramic body containing electromechanically responsive material comprising: forming on a backing of unrefractory material a first layer of a ceramic raw material; forming on said first layer a second layer of a ceramic raw material of a composition different from that of said first-mentioned ceramic material but substantially free of fluxing and chemical action therewith, the material of one of said first and second layers being susceptible, after firing, to conditioning by the application of a unidirectional electric potential to provide an electromechanical response property, and the material of the other of said layers, upon firing and said application of said potential, being effective to provide a different-valued electromechanical response property; and heating the body thus formed to ceramic-firing temperatures to eliminate said unrefractory backing and produce a unitary coherent body of polycrystalline ceramic material having two thickness portions, corresponding to said first and second layers, of materials having upon said conditioning said different-valued electromechanical response properties in said two portions.

3. The method of making a ceramic body containing electromechanically responsive material comprising: forming a first layer of a ceramic raw material; forming on said first layer a second layer of a ceramic raw material of a composition different from that of said first-mentioned ceramic material but substantially free of fluxing and chemical action therewith, the material of one of said first and second layers being susceptible, after firing, to conditioning by the application of a unidirectional electric potential to provide an electromechanical response property, and the material of the other of said layers, upon firing and said application of said potential, being effective to provide a substantially zero-valued electromechanical response property; and heating the body thus formed to ceramic-firing temperatures to produce a unitary coherent body of polycrystalline ceramic material having two thickness portions, corresponding to said first and second layers, of materials having upon said conditioning said different-valued electromechanical response properties in said two portions.

4. The method of making a ceramic body containing electromechanically responsive material comprising: forming a first layer of a ceramic raw material; forming on said first layer a second layer of a ceramic raw material of a composition different from that of said first-mentioned ceramic material but substantially free of fluxing and chemical action therewith, the material of one of said first and second layers being susceptible, after firing, to conditioning by the application of a unidirectional electric potential to provide an electromechanical response property, and the material of the other of said layers, upon firing and said application of said potential, being effective to provide a lower-valued electromechanical response property and a dielectric constant larger than that of said material of said one layer; and heating the body thus formed to ceramic-firing temperatures to produce a unitary coherent body of polycrystalline ceramic material having two thickness portions, corresponding to said first and second layers, of materials having upon said conditioning said different-valued electromechanical response properties in said two portions.

5. The method of making a ceramic body containing electromechanically responsive material comprising: forming a first layer of a ceramic raw material; forming on said first layer a second layer of a ceramic raw material of a composition different from that of said first-mentioned ceramic material but substantially free of fluxing and chemical action therewith, the material of one of said first and second layers being a barium titanate material susceptible, after firing, to conditioning by the application of a unidirectional electric potential to provide an electromechanical response property, and the material of the other of said layers, upon firing and said application of said potential, being effective to provide a different-valued electromechanical response property; and heating the body thus formed to ceramic-firing temperatures to produce a unitary coherent body of polycrystalline ceramic material having two thickness portions, corresponding to said first and second layers, of materials having upon said conditioning said different-valued electromechanical response properties in said two portions.

6. The method of making a ceramic body containing electromechanically responsive material comprising: forming a first layer of a ceramic raw material; forming on said first layer a second layer of a ceramic raw material of a composition different from that of said first-mentioned ceramic material but substantially free of fluxing and chemical action therewith, one of said first and second layers being of a barium titanate material which is susceptible, after firing, to conditioning by the application of a unidirectional electric potential to provide an electromechanical response property, and the other of said layers being of a titanate material which, upon firing and said application of said potential, is effective to provide a lower-valued electromechanical response property; and heating the body thus formed to ceramic-firing temperatures to produce a unitary coherent body of polycrystalline ceramic material having two thickness portions, corresponding to said first and second layers, of materials having upon said conditioning said different-valued electromechanical response properties in said two portions.

7. The method of making a ceramic body containing electromechanically responsive material comprising: forming a first layer of a ceramic raw material; forming on said first layer a second layer of another ceramic raw material, one of said first and second layers containing primarily barium titanate and the other of said layers containing primarily a barium-strontium titanate; and heating the body thus formed to ceramic-firing temperatures to produce a unitary coherent body of polycrystalline ceramic material having two thickness portions, corresponding to said first and second layers, of materials susceptible to conditioning by the application of a unidirectional electric potential to provide different-valued electromechanical response properties in said two portions.

8. The method of making a ceramic body containing eltctromechanically responsive material comprising: forming on the surface of a backing structure a first layer of a first ceramic raw material; forming on the surface of said first layer a second layer of a second ceramic raw material of a composition different from that of said first ceramic material but substantially free of fluxing and chemical action therewith, said forming of at least one of said first and second layers being effected by first applying to the one of said surfaces on which such layer is to be formed an agent for causing coagulation of a ceramic raw material from a dispersion thereof and by then causing contact between said agent on said one surface and a quantity of a dispersion of the corresponding ceramic raw material, and said material of one of said first and second layers being of a composition which is susceptible, after firing, to conditioning by the application of a unidirectional electric potential to provide an electromechanical response property while said material of the other of said layers is of a composition which, upon firing and said application of said potential, is effective to provide a different-valued electromechanical response property; and subsequently heating the body containing said first and second layers to ceramic-firing temperatures to produce a unitary coherent body of polycrystalline ceramic material having two thickness portions, corresponding to said first and second layers, of materials having upon said conditioning said different-valued electromechanical response properties in said two portions.

9. The method of making a ceramic body containing electromechanically responsive material comprising: forming on the surface of a backing structure a first layer of a first ceramic raw material; forming on the surface of said first layer a second layer of a second ceramic raw material of a composition different from that of said first ceramic material but substantially free of fluxing and chemical action therewith, said forming of at least one of said first and second layers being effected by first applying to the one of said surfaces on which such layer is to be formed an aqueous ammonium pentaborate solution containing a dissolved bonding material and by then causing contact between said one surface and a quantity of an aqueous dispersion of the corresponding ceramic raw material to effect coagulation on said one surface by said ammonium pentaborate solution of said such layer comprising said last-mentioned ceramic raw material bonded by coagulated portions of said bonding material, and said ceramic raw material of one of said first and second layers being of a composition which is susceptible, after firing, to conditioning by the application of a undirectional electric potential to provide an electromechanical response property while said ceramic raw material of the other of said layers is of a composition which, upon firing and said application of said potential, is effective to provide a different-valued electromechanical response property; and subsequently heating the body containing said first and second layers to ceramic-firing temperatures to produce a unitary coherent body of polycrystalline ceramic material having two thickness portions, corresponding to said first and second layers, of materials having upon said conditioning said different-valued electromechanical response properties in said two portions.

10. The method of making a ceramic body containing electromechanically responsive material comprising: forming on the surface of a backing structure a first layer of a first ceramic raw material, forming on the surface of said first layer a second layer of a second ceramic raw material of a composition different from that of said first ceramic material but substantially free of fluxing and chemical action therewith, said forming of at least one of said first and second layers being effected by first dipping the one of said surfaces on which such layer is to be formed into a liquid agent for causing coagulation of a ceramic raw material from a dispersion thereof in a liquid medium and by then dipping said one surface carrying said coagulating agent into such a dispersion of the corresponding ceramic raw material, and said material of one of said first and second layers being of a composition which is susceptible, after firing, to conditioning by the application of a unidirectional electric potential to provide an electromechanical response property while said material of the other of said layers is of a composition which, upon firing and said application of said potential, is effective to provide a different-valued electromechanical response property; and subsequently heating the body containing said first and second layers to ceramic-firing temperatures to produce a unitary coherent body of polycrystalline ceramic material having two thickness portions, corresponding to said first and second layers, of materials having upon said conditioning said different-valued electromechanical response properties in said two portions.

CHARLES K. GRAVLEY.

REFERENCES CITED

The following references are of record in the file of this patent:

UNITED STATES PATENTS

| Number | Name | Date |
|---|---|---|
| 1,864,621 | Sprunger | June 28, 1932 |
| 1,993,233 | Winchester | Mar. 5, 1935 |
| 2,171,006 | Morgan et al. | Aug. 29, 1939 |
| 2,360,479 | Detrick et al. | Oct. 17, 1944 |
| 2,389,420 | Deyrup | Nov. 20, 1945 |
| 2,399,313 | Ballard | Apr. 30, 1946 |